United States Patent
Delfer

(10) Patent No.: US 8,274,691 B1
(45) Date of Patent: Sep. 25, 2012

(54) LAZY-PORTRAIT NARROW-EDGE-TO-NARROW-EDGE DOCUMENT PRINTING SYSTEM

(75) Inventor: Frank W. Delfer, Granite Bay, CA (US)

(73) Assignee: DST Output, El Dorado Hills, CA (US)

( * ) Notice: Subject to any disclaimer, the term of this patent is extended or adjusted under 35 U.S.C. 154(b) by 1225 days.

(21) Appl. No.: 11/492,594

(22) Filed: Jul. 25, 2006

(51) Int. Cl.
- H04N 1/46 (2006.01)
- G06K 15/00 (2006.01)
- G06F 3/12 (2006.01)
- B41L 47/46 (2006.01)
- B41J 2/09 (2006.01)
- B41J 2/21 (2006.01)

(52) U.S. Cl. ........ 358/1.18; 358/540; 358/1.15; 101/91; 347/77; 347/43

(58) Field of Classification Search .................. 700/223; 715/209; 358/1.13, 1.9, 1.18, 540, 1.15
See application file for complete search history.

(56) References Cited

U.S. PATENT DOCUMENTS

| | | | | |
|---|---|---|---|---|
| 5,754,434 | A | * | 5/1998 | Delfer et al. ............... 700/223 |
| 5,825,996 | A | | 10/1998 | Davis et al. |
| 5,845,302 | A | * | 12/1998 | Cyman et al. ............... 715/209 |
| 5,887,126 | A | | 3/1999 | Fujimoto |
| 5,995,721 | A | | 11/1999 | Rourke et al. |
| 6,050,191 | A | | 4/2000 | Enderle et al. |
| 6,092,761 | A | | 7/2000 | Mushaben |
| 6,222,635 | B1 | | 4/2001 | Gotoh |
| 6,313,822 | B1 | | 11/2001 | McKay et al. |
| 6,337,745 | B1 | | 1/2002 | Aiello, Jr. et al. |
| 6,417,931 | B2 | | 7/2002 | Mori et al. |
| 6,507,411 | B1 | | 1/2003 | Nishikawa et al. |
| 6,509,977 | B1 | | 1/2003 | Kujirai et al. |
| 6,559,971 | B1 | | 5/2003 | Watts et al. |
| 6,813,038 | B1 | | 11/2004 | Kadowaki |
| 6,965,451 | B1 | * | 11/2005 | Ogg et al. ............... 358/1.8 |
| 6,994,005 | B2 | | 2/2006 | Lamothe |
| 7,014,182 | B2 | | 3/2006 | Marsh |
| 7,474,429 | B2 | * | 1/2009 | Morooka et al. ............ 358/1.15 |
| 2003/0164971 | A1 | * | 9/2003 | Kidani et al. ............... 358/1.13 |
| 2005/0128500 | A1 | * | 6/2005 | Nakagiri ............... 358/1.9 |
| 2005/0243372 | A1 | * | 11/2005 | Sato et al. ............... 358/1.18 |
| 2006/0158706 | A1 | * | 7/2006 | Mori et al. ............... 358/540 |

FOREIGN PATENT DOCUMENTS

| | | |
|---|---|---|
| EP | 1174327 A3 | 1/2002 |
| EP | 1524169 A1 | 4/2005 |
| JP | 05-278930 | 10/1993 |
| JP | 06-040182 | 2/1994 |
| JP | 08-179576 A | 7/1996 |
| JP | 2000-141793 A | 5/2000 |
| JP | 2000-229751 A | 8/2000 |
| JP | 2003-011452 A | 1/2003 |
| JP | 2005-297952 A | 10/2005 |
| JP | 2005-313522 | 11/2005 |
| JP | 2005-320104 A | 11/2005 |
| JP | 2006-137521 | 6/2006 |
| JP | 2006-273158 A | 10/2006 |

* cited by examiner

Primary Examiner — Akwasi M Sarpong
(74) Attorney, Agent, or Firm — James M. Ritchey

(57) ABSTRACT

A system and method for printing documents on a continuous web of printable material by merging document data with form information and formatting the merged result into a printable simplexed or duplexed lazy-portrait narrow-edge-to-narrow-edge page format and printing the merged result to produce simplexed or duplexed lazy-portrait narrow-edge-to-narrow-edge pages on the continuous web of printable material.

2 Claims, 7 Drawing Sheets

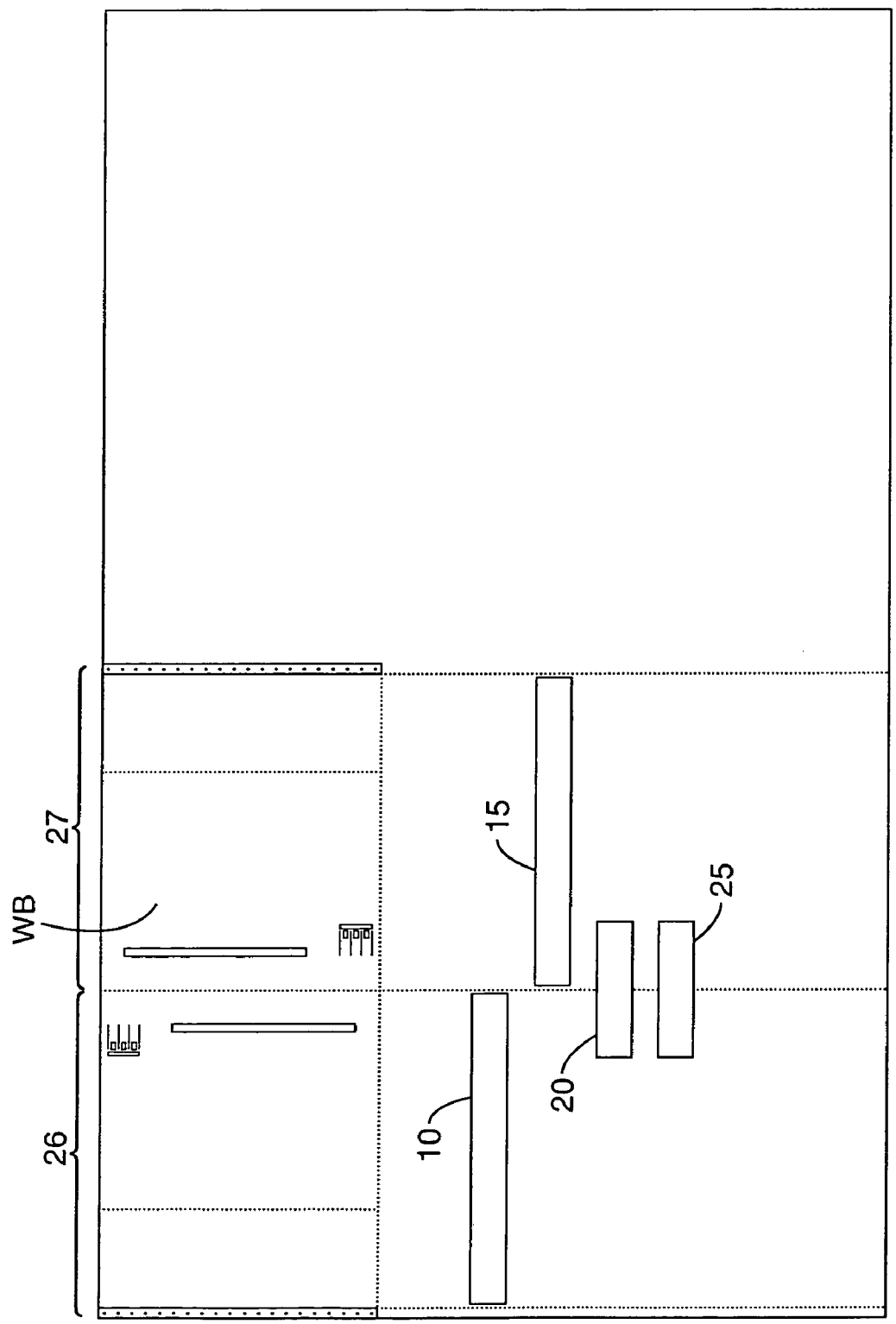

LAZY-PORTRAIT NARROW-EDGE-TO-NARROW-EDGE DOCUMENT PRINTING SYSTEM

BACKGROUND OF THE INVENTION

1. Field of the Invention

This invention pertains generally to a physical orientation scheme for printer heads in a digital printer utilizing high-speed simplex (one side of a sheet) and/or duplex (both sides of a sheet) variable data printing techniques that increases the efficiency of printing simplexed or duplexed documents, thereby dramatically reducing associated costs for the printing process. More specifically, the subject invention comprises a printing and handling system for formatting printed documents in a post-printing easily handled simplex/duplexed lazy-portrait (narrow-edge of a first page to a narrow-edge of a second page) orientation to minimize the size of required and expensive color-capable printing heads.

2. Description of Related Art

The exceedingly novel and non-obvious subject invention comprises a system that maximizes the use of less expensive black printing heads and minimizes the use of more expensive color-capable printing heads to print paired-documents oriented in a lazy-portrait (narrow-edge of a first page to a narrow-edge of a second page) fashion, wherein a single more expensive color-capable printing head is utilized to print "across" a page from one long-edge to the second long-edge, such as simultaneously printing both paired-document headings with only one color printing head. No comparable, or even remotely similar, printing system exists in the known references. The subject system may be utilized to print in a head-to-head, bottom-to-bottom, or head-to-bottom fashion with one or more color heads and one or more black heads or only black printing heads if no color is needed for a particular printing job.

U.S. Pat. No. 6,417,931 teaches a printing layout device and method for implementation via a computer means. Two separate document pages may be printed in a parallel orientation with the margins set to any desired distance. The adjustable margin is to allow for binding of the pages. The program shrinks the existing print to fit any desired set of margins. The subject invention does not decrease data to fit on bindable pages within a printed sheet nor are variable-bindable margins addressed or of interest in the subject head-to-head printing scheme.

Found in U.S. Pat. No. 6,507,411 is a printing control method and apparatus, wherein a printed image forming a large poster consists of a displayed array of smaller output images. The manner of the display, basically enlarging the array smaller output images to a suitable size for the poster, can be manipulated within predefined parameters. The subject system does not enlarge a plurality or images to fit on a single larger sheet or poster.

U.S. Pat. No. 6,559,971 relates a printing method, wherein an image is self-resizing to fit a preferred media size. The final page is printed on a standard printer apparatus. No resizing of data to fit on one printed page is involved with the subject invention.

Disclosed in U.S. Pat. No. 5,887,126 is a method of controlling printing in a printing apparatus, wherein the invention truncates or extends, whatever is appropriate, printing variables to produce a neatly presented printed page. This system scales images to the size of the printable page area. The subject system does not truncate or extend print jobs prior to transferring to a printer.

Described in U.S. Pat. No. 6,813,038 is a system for controlling image processing via linked spooling of incoming print jobs. Incoming print jobs are concatenated together and then transferred to a printer. No concatenation exists within the subject system.

U.S. Pat. No. 5,995,721 presents a document processing and printing system. The invention is a distributed printing system with a plurality of document processing subsystems and, more particularly, a system which examines the attributes of a target document for the purpose of delivering one or more portions of the document to one or more of the document processing subsystems on the basis of the examination of the attributes. The current subject invention does not parse print jobs to determine job attributes since they are known prior to job creation. The '721 claims are all directed to "reproduction" of documents, which is not found within the subject invention that deals only with "production" of documents.

Disclosed in U.S. Pat. No. 6,509,977 B1 is a printing control system utilizing a unified user interface for bookbinding. The system basically collates sheets in correct sequence so they my be bound into a book format. No bookbinding or related sheet ordering exist with the subject system.

U.S. Pat. No. 6,313,822 B1 presents a method and apparatus for modifying screen resolution based on available memory in the controlling computer system. This system merely modifies screen resolution for monitor resolution and is not related directed to the subject invention.

A print data control system is presented in U.S. Pat. No. 6,222,635 B1.

A way to increase printer speed to print from a host computer to a printer through a data interface is described, which is not related to the subject invention.

In addition to the above mentioned patents, the current state of high-speed duplex variable data printing, utilizing both black and color-capable print heads, known to Applicant, is illustrated in FIG. 1 (denoted as "Prior Art"). Existing high-speed duplex variable data printing is carried out most frequently with continuous form printers using what is termed a "two-up" format. Two portrait printed sheets are printed side-by-side. This process, the standard in the industry, produces a continuous output of pages where the first four sheets (eight pages, front and back) appear as shown in FIG. 1. The advantage of printing in the prior-art format is that it is compatible with more printers and more post-printing equipment for handling the printed sheets. A critical existing element of the prior-art printing method is that to print either black or color markings on both pages, with the headings in color and the body in black, both the black and color-capable printing heads must span the entire width (long-side to long-side of a page) of both the duplexed sheets, $W_B$ and $W_C$, respectively. Currently, color-capable printing heads are much more costly than equivalently sized black printing heads. Examples of printers that function in this manner are the IBM InfoPrint 4000 and Oce VarioStream 7000.

BRIEF SUMMARY OF THE INVENTION

An object of the present invention is to provide a high-speed duplex variable data printing system and method for producing lazy-portrait paired forms in a combined black and color format or an all black format.

Another object of the present invention is to furnish a system and procedure for decreasing the cost of printing simplexed or duplexed forms in a combined black-body and color-heading format or and all black format.

A further object of the present invention is to supply a system and procedure that employs a printing system that minimizes the required size of color-capable printing heads to print desired regions on documents that are in color.

Disclosed is a system and method for printing documents on a continuous web of printable material by merging variable document data with form information and formatting the merged result into a printable simplexed or duplexed lazy-portrait page format and printing the merged result to produce simplexed or duplexed lazy-portrait pages on the continuous web of printable material. In the subject lazy-portrait format the narrow-edge of a first page is mated to a narrow-edge of a second page. Commonly, the two mated narrow-edges are the headings for each page in a head-to-head configuration, however, the mated narrow-edges may be top-to-bottom or bottom-to-bottom. More specifically, a system and method are presented for printing documents, with each document comprised of one or more pages with each page having a head region proximate a narrow-edge top, a narrow-edge bottom, and two long-sides, on a continuous web of printable material. In the duplexed embodiment, the continuous web has both a face side and a back side with at least two printing lanes on each of the face and back sides. Variable document data is merged with form information and then formatted into a merged result that is in a printable duplexed lazy-portrait head-to-head page format (in the simplexed embodiment only one side of a sheet is utilized). With the duplexed embodiment, the merged and formatted result is printed to produce duplexed lazy-portrait head-to-head pages on the continuous web of printable material. With multi-page documents, odd numbered pages are printed on the back of a first web printing lane and on the face of a second and adjacent web printing lane with even numbered pages printed on the face of the first web printing lane and on the back of the second web printing lane. Additionally, provided is a means for physically separating the first printing lane from the adjacent second printing lane to generate two narrower continuous webs with the first printing lane on one of the generated narrower webs and the second printing lane on the other narrower web. Further, disclosed are means for flipping one of the narrower continuous webs over in the duplexed embodiment, means for cutting each page from other pages, and means for collating the cut pages into the documents with one or more pages per each document.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a depiction representing the PRIOR ART, wherein four total sheets are shown with paired/duplexed-document pages printed side-by-side, with all side-by-side pages oriented in traditional portrait-parallel fashion to one another.

FIG. 2 illustrates the subject invention wherein four total printed sheets are depicted in a duplexed lazy-portrait head-to-head page orientation and printed on the web in two printing lanes (simplexed printing jobs are only printed on one side of a sheet, thereby making assembly of a multi-page document more simplistic than with the duplexed embodiment which requires a sheet flipping process step).

FIG. 7 shows duplexed printing with the subject system's page format in two printing lanes on the web in which two large black printing heads (one for each page) are followed by two smaller color printing heads (both aligned to print desired color page headings).

Figure 8:
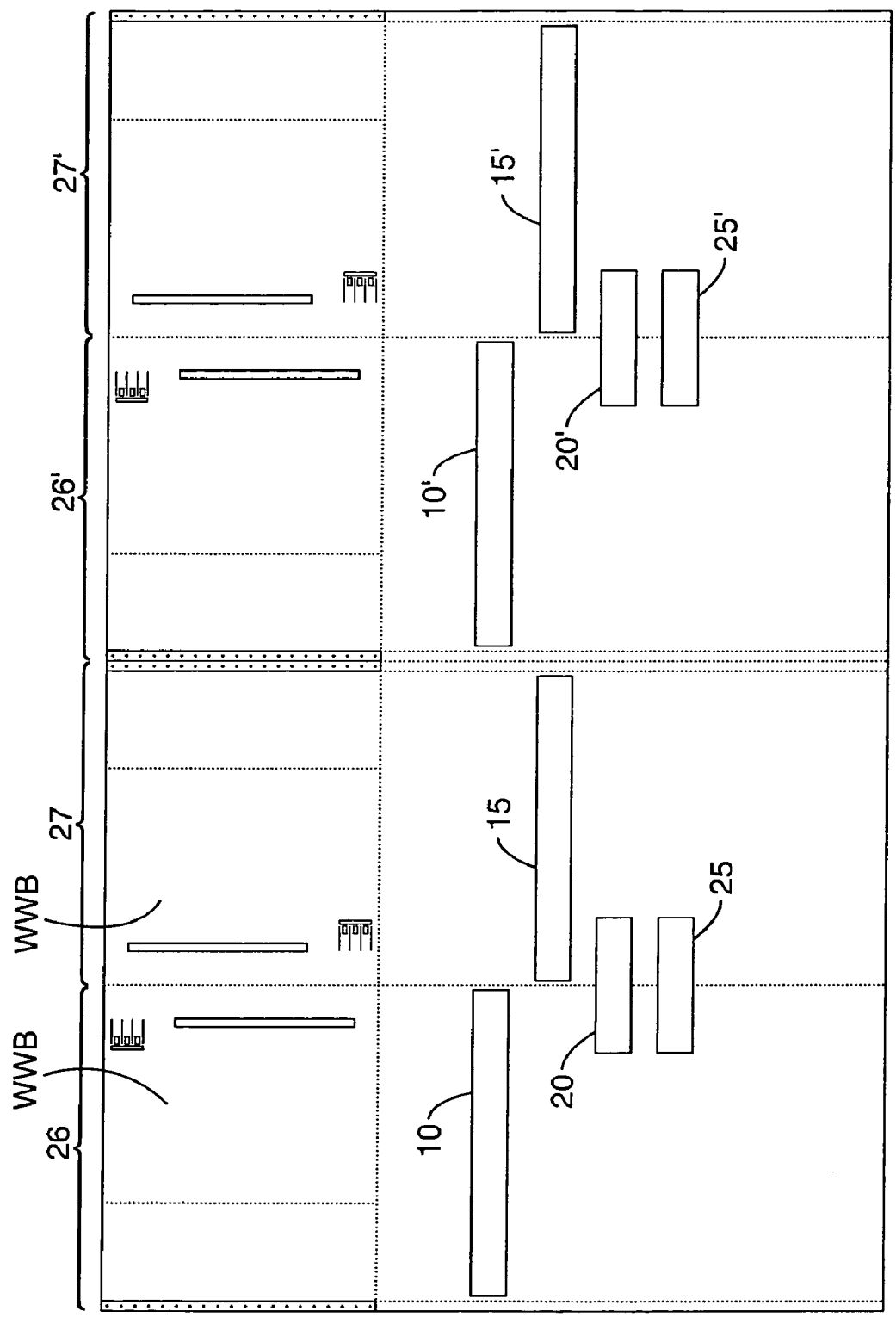

FIG. 8 shows paired duplexed printing (four pages at once in separate printing lanes with a printer of sufficient size to accommodate such a wide web configuration) with the subject system's page format in which each of two pairs of large black printing heads (one pair for each head-to-head formatted page set or one for each individual page) are followed by two smaller color printing heads (all four smaller color printing heads aligned to print desired color page headings).

Figure 9:
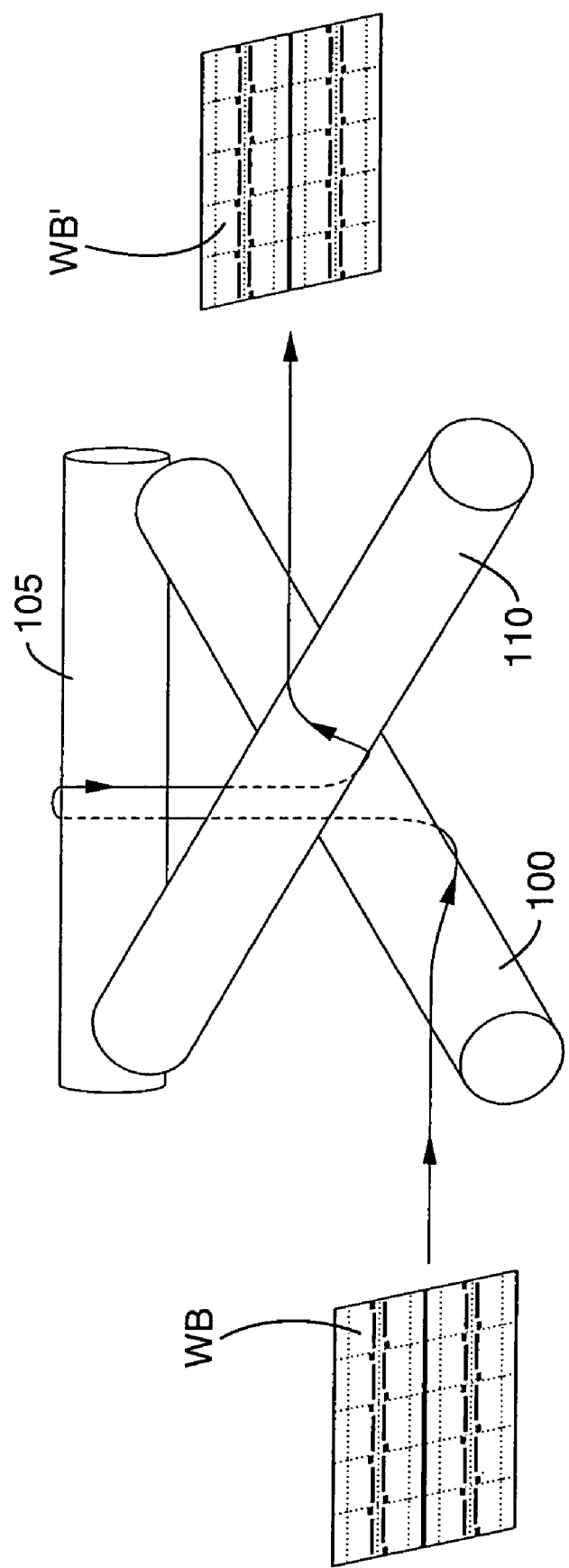

FIG. 9 depicts a traditional "turning-bar" that is utilized in a novel manner to flip one stream of printed sheets to permit the novel sequential page stacking found in the subject invention.

Figure 10:
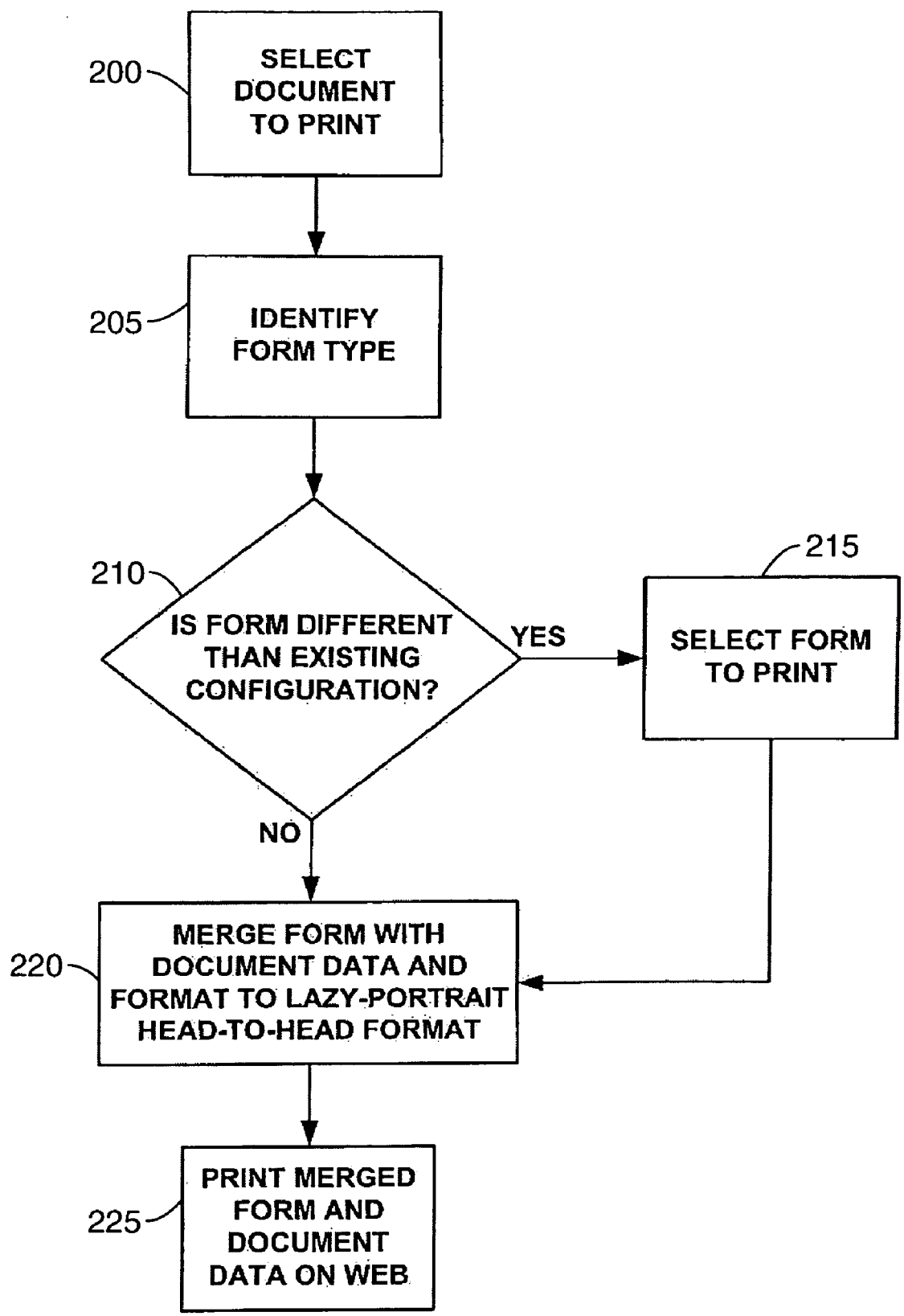

FIG. 10 is an information flow diagram that traces the steps utilized by the subject system controller to correctly orient the page formats in accordance with the subject invention.

DETAILED DESCRIPTION OF THE INVENTION

Figure 2:
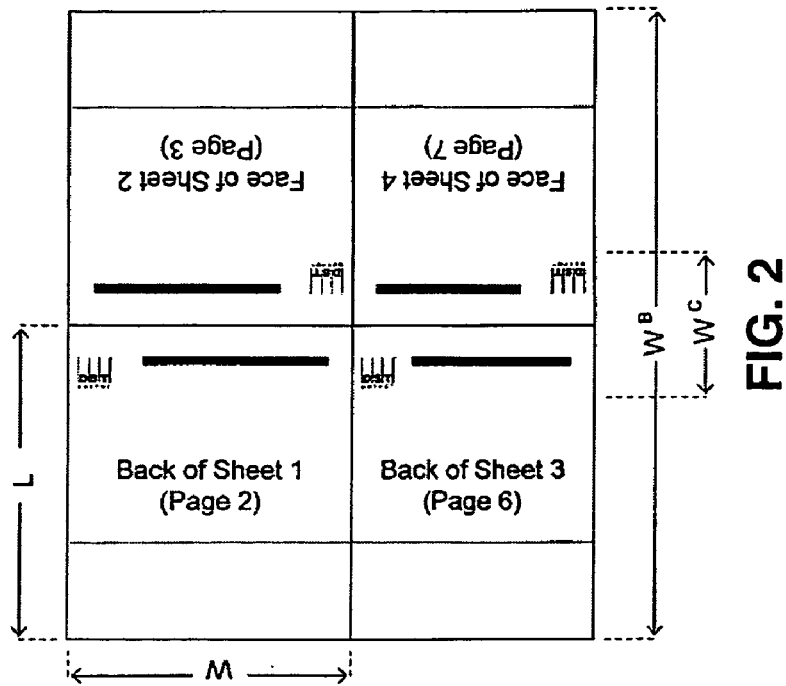
Figure 6:
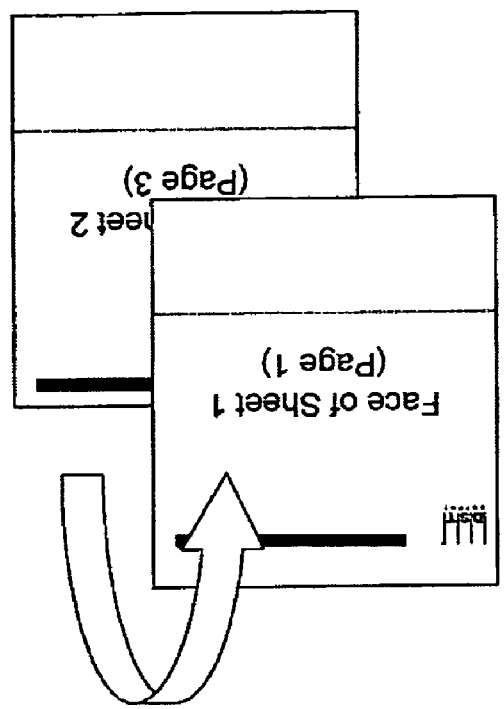
FIG. 6 illustrates the subject invention wherein the two duplexed lazy-portrait head-to-head printed sheets require that one sheet be flipped over and placed on top of the second sheet to produce a four page statement/document in which the pages are sequentially ordered.
Figure 5:
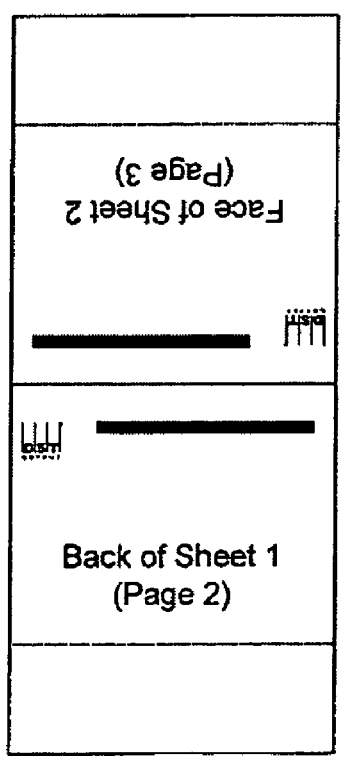
FIG. 5 illustrates the subject invention wherein only two printed sheets are shown in a duplexed lazy-portrait head-to-head orientation.

Referring more specifically to the drawings, for illustrative purposes the present invention is embodied in the apparatus generally shown in FIGS. 2, 5, and 6. It will be appreciated that the apparatus may vary as to configuration and as to details of the parts, and that the method may vary as to the specific steps and sequence, without departing from the basic concepts as disclosed herein.

The subject system and method generates printed documents that are oriented in a "lazy-portrait" alignment on each simplexed or duplexed page (FIGS. 2 and 5 clearly show this lazy-portrait orientation for the duplexed format). The term "lazy-portrait" refers to the fact that the printed sheets appear to be "laying down sideways" or "lazy," but the finished product is not a traditional "landscape" format since it retains the height-exceeds-width quality of the traditional "portrait" page presentation. In the lazy-portrait format the desired narrow-edges (portrait top and/or bottom) of two pages are mated directly adjacent to one another and may be head-to-head, head-to-bottom, or bottom-to-bottom in configuration. Both of the example printers above (IBM InfoPrint 4000 and Oce VarioStream 7000) are capable of printing in both the traditional portrait format and in the subject lazy-portrait format. It is noted that there appears, at first glance and only at first glance, to be a disadvantage to the lazy-portrait printing orientation, which is that special/non-traditional post processing equipment would be required due to the novel and non-conventional duplexed lazy-portrait layout embodiment. The subject invention contains a novel solution to this initially perceived post-printing problem that eliminates its impact. The subject disclosed solution for the duplexed embodiment, in head-to-head exemplary orientation, is described in detail below and is, as mentioned, exemplary only since head-to-bottom or bottom-to-bottom orientations are likewise contemplated to be within the realm of this disclosure.

It is stressed that at least three important advantages become available when printing in the simplexed or duplexed lazy-portrait format embodiments:

1) Increased Throughout—More final printed sheets are produced per foot of paper and per minute of printing;

2) Lower Color Costs—When color and black printing regions are utilized, the width each color-capable printer head and associated components is reduced, thereby decreasing printing costs since each black printing head and associated components are less costly; and 3) Increased Reliability—The remit perforations, if present, run in line with the web, not across, thereby yielding a strengthened configuration that is less likely to tear during processing.

Each of these above advantages is expanded in more detail immediately below.

Increased Throughput—The first advantage is valuable because ongoing printer costs are driven by the length of the web printed, not by the number of sheets produced on the web. Also, printer operator labor is driven by the number of hours the printer is manned, not by the number of sheets produced. Thus, raising the number of sheets produced without impacting the length of the web processed or the number of hours the printer is manned by the operator directly causes on-going printer and labor costs to drop on a per-sheet basis.

Figure 1:
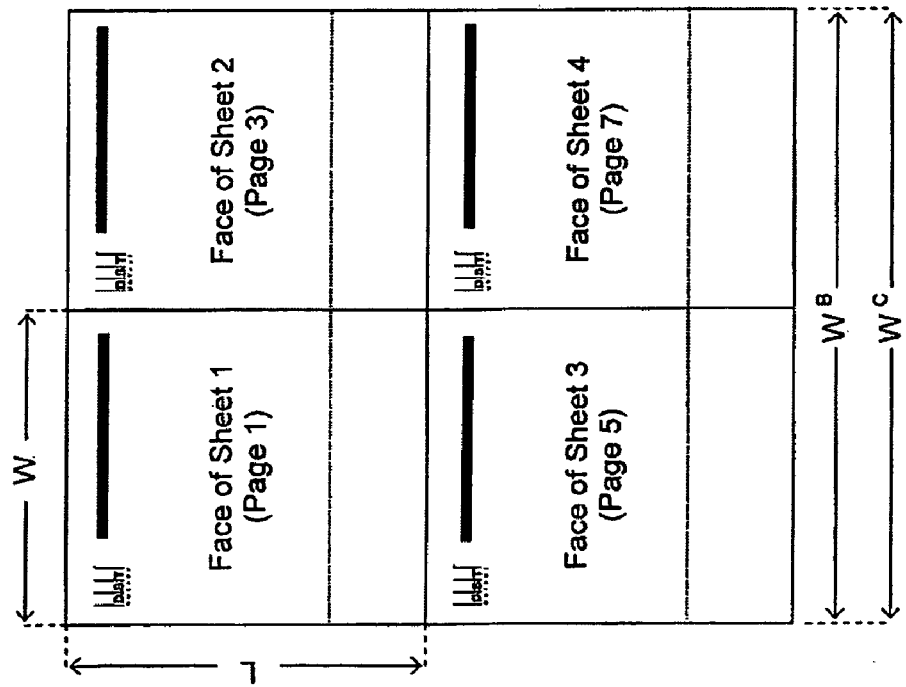

For example, as depicted in PRIOR ART FIG. 1, using the traditional/conventional two-up (side-by-side or long-side-to-long-side) printing format, if the sheet width is 7 inches and the length is 9 inches, a 250 foot per minute printer will produce $(2\times250\times60\times12)\div9=40,000$ sheets in one hour. Using the subject invention's duplexed lazy-portrait head-to-head printing format gives $(2\times250\times60\times12)\div7=51,428$ sheets in one hour, a 28.6% improvement.

A critical requirement is that the utilized printer be able to accommodate the wider web. This doesn't work for all printing jobs, obviously, but for those that do fit, it is a huge productivity jump, both in labor and capacity costs.

Lower Color Costs—The second important benefit introduced by subject invention's simplexed or duplexed lazy-portrait head-to-head printing embodiment is that the width of the form that the printer must be able to impart color upon for mated heading regions is dramatically reduced (this assumes that color is utilized for printing the relatively narrow heading/title region of the sheets). This presents significant opportunities to reduce the cost of printing.

As seen in PRIOR ART FIG. 1, in conventional/traditional side-by-side/two-up printing the width of the form that must be accessed by color-capable printer components, $W^C$, is the same as that which must be accessed by the black-only printer components, $W^B$.

In the subject invention's duplexed lazy-portrait head-to-head printing, the colored border heading areas or part of the form can be a fraction of the width of the black-only part of the form. This reduces the overall cost of printing significantly, because the per-foot cost of running a four-inch or six-inch wide color-capable print head could be only a quarter or even a tenth the cost of running an 18-inch wide color-capable print head.

As exemplary duplexed head-to-head orientation examples, FIGS. 2 and 7 show two lanes of printing or one duplexed lazy-portrait head-to-head pairing on the web material. FIG. 8 shows four lanes of printing or two duplexed lazy-portrait head-to-head pairings on the web.

An example of a printer that presents the opportunity to reduce color printing costs by the use of the subject invention's simplexed or duplexed lazy-portrait head-to-head printing format is a Versamark 3700. The reason costs would be lowered is this particular machine (and other equivalent printers) would use smaller, less expensive heads (Versamark ink jet print heads) for color printing.

Increased Reliability—Note that in the printing of various documents (e.g. bills and statements) it is common for the bottom panel of the image to include the remit form, or tear-off part that a bill recipient removes and then mails to a remit processor. The remit form is at the bottom of the printed page because the remit process works better when the bottom of the remit is a clean, cut edge—not a stubbly torn off edge. In conventional side-by-side/two-up printing, this means that each remit perforation has to run across the web. This creates problems in high speed printing because it physically weakens the strength of the web, increasing the chance that the web will accidentally break during printing. Web breakage is an expensive and time-consuming event/exception that costs the printing entity in many ways: labor; capacity; maintenance; turnaround; and like negative results. Worse yet, in order to get paper with cross-ways perforations to run in a sufficiently reliably manner, the printing entity may take on higher, permanent paper and perforation costs. An example of a printer that uses a higher-tension web and would, therefore, be more subject to this particular accidental breakage reliability problem is the Versamark 3700.

In contrast, using the subject invention's duplexed lazy-portrait printing scheme, the perforations run in line with the web, almost completely eliminating any chance of web breaks caused by the web tension overcoming the remit perforation strength. Since tension across the web is almost non-existent, there is no concern about length-wise remit perforation breaks.

Of course, if the printer output is fan-folded then there will be a fan-fold perforation that will always run cross-wise to the web, and if this perforation is weaker than the remit perforation then the subject invention's simplexed or duplexed lazy-portrait printing orientation advantage is somewhat reduced in this one advantage area. But if the output are cut sheets or a roll, the subject invention's simplexed or duplexed lazy-portrait printing is a real and significant advantage.

To illustrate a novel aspect of the subject invention, the way in which printed pages are assembled is now described in detail. Specifically, the duplexed head-to-head embodiment is presented in detail for exemplary purposes only and not by way of limitation. It must be appreciated that the subject head-to-bottom or bottom-to-bottom page formatting embodiments are additional printing schemes that are equivalent to the detailed presentation for the subject head-to-head embodiment. Further, it is noted that the subject simplexed embodiment does not require flipping of the sheets for proper numeric sequencing of the pages within a single document.

Figure 4:
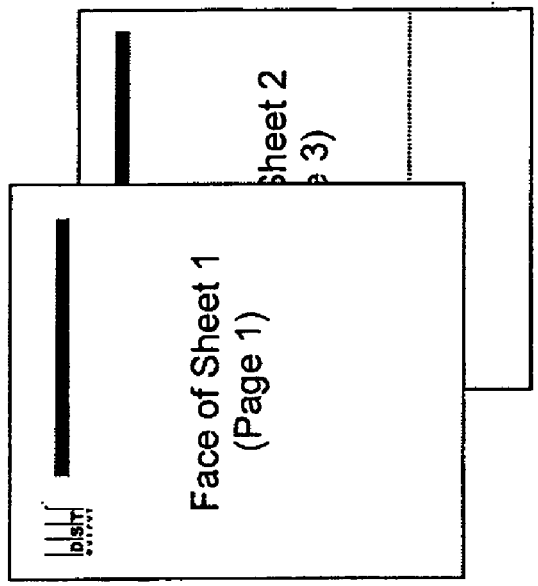
FIG. 4 is a depiction representing the PRIOR ART, wherein two sheets are shown stacked on top of one another to generate a four page statement/document in which the pages are sequentially ordered.
Figure 3:
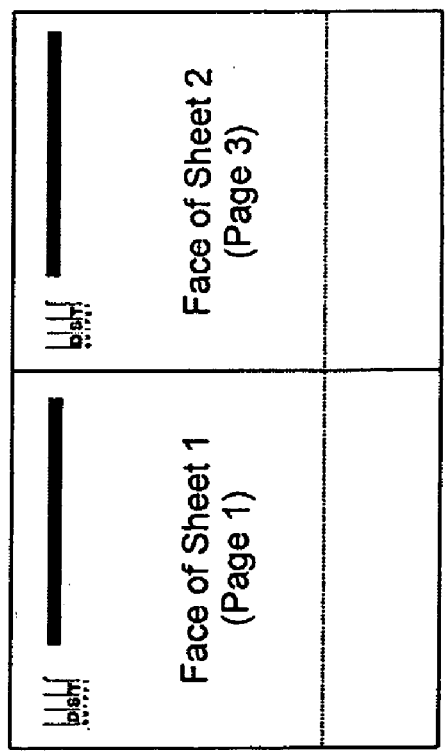
FIG. 3 is a depiction representing the PRIOR ART, wherein only two sheets are shown with paired/duplexed-document pages printed side-by-side, with the side-by-side pages oriented in traditional portrait-parallel fashion to one another.

As clearly presented in PRIOR ART FIG. 3 (PRIOR ART FIG. 3 shows only the top two sheets seen in PRIOR ART FIG. 1), it is very instructive to look closely at the way in which the two side-by-side/two-up printed sheets are connected in the conventional/traditional way to each other. In order to produce a four-page statement from the two sheets depicted in PRIOR ART FIG. 3, it is necessary to cut the two sheets apart and place the first sheet over or on top of the second sheet, without flipping, turning, or twisting either sheet (as seen in PRIOR ART FIG. 4). This traditional process is the simplest and easiest way to assemble a 4-page statement/document from the conventional side-by-side two sheet wide continuous form print job. A wide variety of equipment currently exists to carry out this common assembly task automatically with either a stand-alone or in-line envelope inserter.

An example of a machine capable of performing traditional task is as a Tecnau TC2000 Cutter. This device works in several configurations, including in-line with a slitter to process two-up output. Another example of this equipment is a Stralfors Lasermax 162CD Cutter.

For the head-to-head embodiment, the subject invention provides a novel method for handling the lazy-portrait head-to-head printed sheets that are, initially, connected to each other as shown in FIG. 5 for only two sheets. Note how in FIG. 5, on the left side of the web, the side of the sheet presented to the viewer is the BACK of sheet 1, whereas on the right side of the web, the side of the sheet presented is the FACE of sheet 2. To assemble this two-sheet statement/document, these two sheets must come together like butterfly wings, i.e. one side has to be flipped over onto the other, as clearly shown in FIG. 6.

This additional element of processing complexity significantly impacts the statement assembly process. For example, the Stralfors Lasermax 162CD Cutter mentioned above, utilized in conventional print jobs, would be completely incapable of processing the subject invention work properly, because it is incapable of carrying out the butterfly maneuver. On the other hand, the Tecnau TC2000 Cutter mentioned above would need only to: 1) have one of the sub-webs turned over after slitting, and 2) be able to cut the length, L, of the statement/document, rather than just the width, W, of the statement/document. The second requirement is easily met for all ordinary sizes of forms, certainly all those for which the length is 12 inches or less. The first requirement can be met in at least two ways: 1) by employing a device known as a "turn-bar," as shown in FIG. 9 or 2) simple statement/document stack rotation at the inserter. A turn-bar is a series of rollers (100, 105, and 110) that flip a web WB of paper over (WB flipped to WB' in FIG. 9) on the fly during processing. The application is common in continuous web printing; in fact such a turn-bar is employed in both of the continuous form printer examples mentioned above, but for different reasons than apply for the subject invention. The turn-bar resides between the two engines in both examples. The turn-bars 100, 105, 110, seen in FIG. 9, effect the following series of state changes to a web WB: 1) turn-bar 100 performs a 90° turn with a flip; 2) turn-bar 105 performs a 180° turn with a flip; and 3) turn-bar 110 performs a 90° turn with a flip. The resulting "0° turn with a flip" processing ability is exactly the web state change needed for the subject invention.

With a turn-bar device positioned between Tecnau-type slitter and cutter units, the subject invention lazy-portrait head-to-head printing embodiment work is processed faster than traditional two-up work, because the sheets only have to travel the short distance W between cuts, rather than the longer distance L. This throughput benefit is similar to the printing throughput benefit mentioned above.

This subject invention cutting process also enjoys a reliability benefit similar to the accidental web breakage problem mentioned above, because the remit perforation would again run in line with the sub-web, rather than across it, reducing the likelihood of a web break on the remit perforation.

An exemplary alignment of printing heads, relative to the printed web WB, to print duplexed lazy-portrait head-to-head pages in two lanes 26, 27 is shown in FIG. 7. Two large black printing heads 10, 15 are positioned so that one prints one page and the other prints a second page. Two small color printing heads 20, are aligned to print the color headings on the pages (FIG. 7 depicts two color heads, but one or more color printing heads are contemplated to be within the realm of this disclosure).

An additional embodiment of the subject invention is illustrated in FIG. 8. Depicted in FIG. 8 is a printer configuration for the subject invention in which a wider web WWB is utilized with four lanes of printing 26, 27, 26', 27'. In this embodiment the printer head alignments found in FIG. 7 are doubled, side-by-side. Pairs of duplexed lazy-portrait head-to-head pages are printed simultaneously along the web in this embodiment. Four large black printing heads 10, 10', 15, 15' are positioned so that each one prints one page in the parallel duplexed lazy-portrait head-to-head page format. Four small color printing heads 20, 20', 25, 25' are aligned to print the color headings on the pages (again, as in FIG. 7, FIG. 8 depicts two color heads per duplexed lazy-portrait head-to-head page pair, but one or more color printing heads for each duplexed lazy-portrait head-to-head page pair are contemplated to be within the realm of this disclosure).

In must be appreciated that other color and black printing head arrangements are contemplated to be within the realm of this disclosure. Part or all of the narrow-edge-to-narrow-edge pages may be printed with a color head and the other page with a black head or other head combinations. Additionally, multiple printing heads of various color and black combinations may be used with the narrow-edge-to-narrow-edge formats in either the simplexed or duplexed embodiments.

The basic information control scheme for the subject invention is depicted in FIG. 10. By usage of traditional programmable control means and associated database(s), a desired document is selected to be printed 200. Once the document is selected, the required form type is identified 205. The printer may have last been used to print a different form so the existing printer configuration is examined 210. If the current form is the same as the previous form then no alteration in the printer configuration is needed, but if the form differs then the correct form is selected 215. The form is then merged with the document data and the lazy-portrait narrow-edge-to-narrow-edge page format is applied 220. Then merged form and document data is then printed 225 in the subject simplexed or duplexed lazy-portrait narrow-edge-to-narrow-edge page format.

Thus, in employing the subject system, selected document data is supplied to the controller of the system and matched with the desired type of form on which to print the selected document data. The document data is then merged with the form information and both are printed in the subject simplexed or duplexed lazy-portrait narrow-edge-to-narrow-edge page format on a continuous web of printable material, like paper. As noted above for the duplexed embodiment, for exemplary purposes only and not by way of limitation, FIG. 5 depicts nicely the system's sheet formatting alignments with the back of sheet 1 (page 2) duplexed to the face of sheet 2 (page 3) so that once sheet 1 is separated from sheet 2 along the common top border and flipped the pages read in sequential face-to-back order (1 to 2 to 3 and so on).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for printing documents, wherein the documents are comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material, wherein the continuous web has a direction of motion during the document printing process, comprising:
    a) a programmable computer and associated database containing document data and form information for merging document data with form information to produce said merged document information and formatting said merged document information into a printable duplexed head region-to-head region printed merged document format comprised of two paired material sheets mated at said narrow-edges having head region-to-head region merged document information printed on said paired material sheets wherein said printed head region-to-head region merged document information has a shared axis that is parallel with said side long-edges and is perpendicular to the direction of motion of the continuous web and
    b) a printer for printing said merged document information, interfaced with said means for merging and formatting, wherein said printer is configured to print said duplexed head region-to-head region merged document information on the continuous web, wherein said printer comprises:
        i) paired first printer heads with each head within said pair printing in black on one material sheet of said duplexed head region-to-head region material sheet formatted document and
        ii) at least one second printer head for printing in color in the head region on both material sheets of said duplexed head region-to-head region material sheet formatted document.

2. A method of printing documents, wherein the documents are comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material, wherein the continuous web has a direction of motion during the document printing process, comprising the steps:
    a) merging document data with form information to produce merged document information and formatting said merged document information into a printable duplexed lazy-portrait head region-to-head region sheet format within a computer readable database, wherein said head region-to-head region sheet format produces head region-to-head region oriented printed material sheets have a shared axis that is parallel with the side long-edges and is perpendicular to the direction of motion of the continuous web and
    b) electromechanically printing said merged document information to produce duplexed lazy-portrait head region-to-head region sheets on the continuous web of printable material, wherein said printing of said merged document information utilizes a printer having:
        i) paired black printer heads with each head within said pair printing on one material sheet of said duplexed head region-to-head region sheet formatted document and
        ii) at least one color printer head for printing on both material sheets of said duplexed head region-to-head region sheet formatted document.

* * * * *